United States Patent [19]

Babb

[11] 3,957,325

[45] May 18, 1976

[54] THRUST BEARING RACE

[75] Inventor: James Alex Babb, Enoree, S.C.

[73] Assignee: The Torrington Company, Torrington, Conn.

[22] Filed: Aug. 6, 1975

[21] Appl. No.: 602,243

[52] U.S. Cl. .............................................. 308/235
[51] Int. Cl.² ........................................ F16C 33/58
[58] Field of Search ............ 308/219, 216, 235, 236

[56] References Cited
UNITED STATES PATENTS

| 3,713,713 | 1/1973 | Alling et al. ......................... 308/235 |
| 3,900,235 | 8/1975 | Alling et al. ......................... 308/235 |
| 3,913,994 | 10/1975 | Alling et al. ......................... 308/235 |

Primary Examiner—M. H. Wood, Jr.
Assistant Examiner—Richard A. Bertsch
Attorney, Agent, or Firm—Frank S. Troidl

[57] ABSTRACT

The thrust bearing plate may be used as part of a thrust bearing having a thrust bearing cage with rolling members contained in pockets of the cage. The thrust bearing plate includes an annular portion with a plurality of channels circumferentially spaced around the inner periphery of the annular portion. An axially extending segmented flange is used to guide the thrust bearing cage. Each circumferential end of each segment of the flange forms at least a part of a side of a channel. Each segment is also provided with a turned-in portion which extends a predetermined circumferential distance from each of the segment circumferential ends.

4 Claims, 3 Drawing Figures

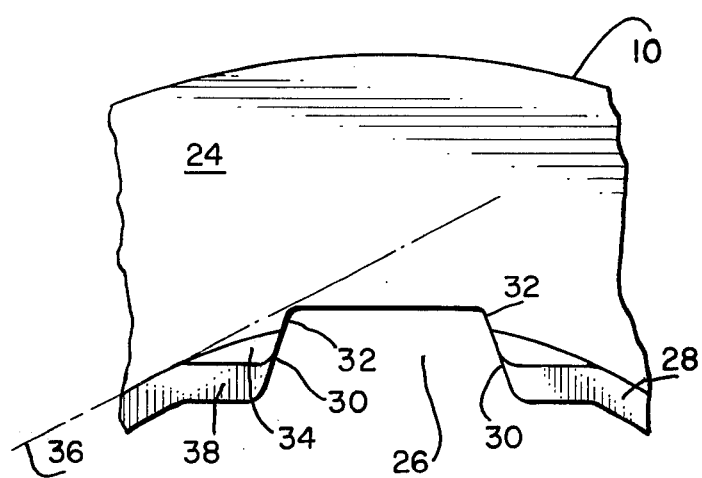
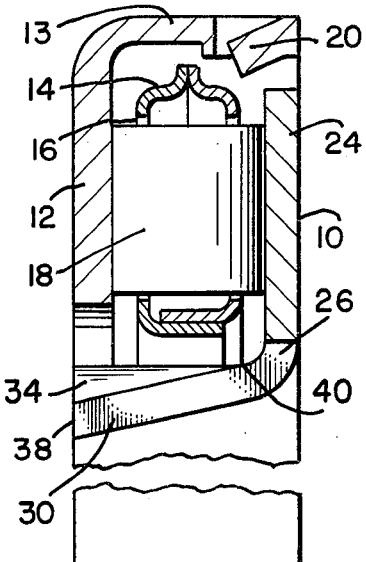
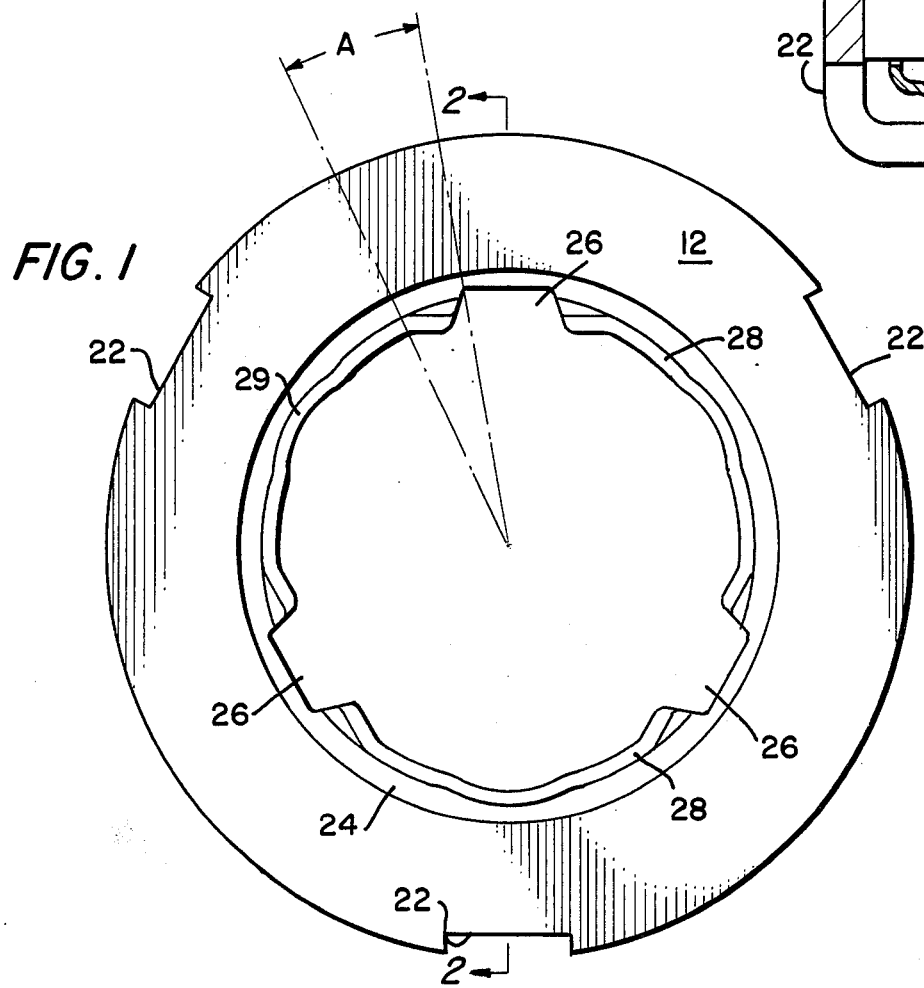

THRUST BEARING RACE

This invention relates to thrust bearings. More particularly this invention is a new and improved annular thrust bearing plate.

With currently used thrust bearings, including a thrust plate with a segmented annular inner flange, with the segments separated by channels which may be lubricant passages or slots formed for some other purpose, the radial distance from the plate axis of all the parts of the segment is substantially the same. The segmented flange of these currently used thrust bearings plates is used as a guide for the cage containing the rolling members. Unfortunately, the comparatively sharp edges of the segment wear into the bearing cage. Not only does this add an abrasive element to the lubricant, which is harmful to the bearing and to the mechanism in which it is used, but also in some cases, such as with a two-piece thrust bearing cage, a wall of the cage is worn completely through so that the cage separates far enough to lose the rollers which in turn cause damage to or complete destruction of the mechanism in which the bearing is mounted.

My invention provides the art with a new thrust bearing, including a new and improved thrust bearing plate which includes a segmented inner flange used to guide the thrust bearing cage without wearing into the cage.

Briefly described, ny new invention includes a thrust bearing plate with a plurality of channels circumferentially spaced on the inner periphery of the plate. The segmented flange for guiding the thrust bearing cage has turned-in portions which extend from the circumferential ends of each segment. The turned-in portion extends a predetermined circumferential distance along the segment.

The bearing cage does not contact the edges of the segments of the flange.

An additional benefit to this invention is that the lubricant instead of being wiped off the cage by the edge of the segments is now drawn in between the flange segments and the cage which drastically reduces rubbing contact and wear between the segmented flange and the cage.

The invention, as well as its many advantages, may be further understood by reference to the following detailed description and drawings in which:

FIG. 1 is an elevational view illustrating one preferred embodiment of my invention;

FIG. 2 is a sectional view on an enlarged scale taken generally along the lines 2—2 of FIG. 1; and FIG. 3 is a fragmentary view on an enlarged scale showing the detailed structure of the turned-in portions of the edges of the flange segments.

Like parts are referred to by like numbers in the various figures.

Referring particularly to FIG. 1 and FIG. 2, the thrust bearing includes a first thrust plate 10 and a second thrust plate 12. A cage 14 having a plurality of circumferentially spaced pockets 16 for retaining the rolling members 18 is mounted between the thrust plates 10 and 12.

The thrust plate 12, with its outer flange 13, and the cage 14, with the rollers 18, and the thrust plate 10 with the inner segmented flange, may form one unit and be sold and transported as a unit. When transported, the cage 14 is retained with limited axial movement within the thrust plate 12 by the inwardly extending tab 20. The edge of the tab 20 will be contacted by the outer edge of the cage 14 if the cage 14 tends to fall out of the thrust plate 12. The outer flange 13 of thrust plate 12 may also be provided with a plurality of circumferentially spaced lubrication channels 22.

The thrust plate 10 includes an annular portion 24 which is provided on its inner periphery with a plurality of circumferentially spaced channels 26. A segmented flange including a plurality of axially extending segments 28 extend from the inner periphery of the annular portion 24 and serve to guide the thrust bearing cage 14. Outwardly extending portions 29 retain the plate 10 to the cage 14 with limited axial relative motion possible. The number of segments corresponds to the number of lubrication channels 26. In other modifications there will be more channels than segments, with some other structural feature between some channels.

Each circumferential end 30 of each of the segments 28 forms a continuation of the sides 32 of the channels 26. In some modifications, the segment does not extend to the slot in the base portion 24. The turned-in portion 34 extends along the flange segment 28 from the end 30 for a predetermined circumferential arc A indicated in FIG. 1. Preferably this circumferential arc ranges from 3° to 20°. A smaller diameter bearing will require a greater arc. A larger diameter bearing can use a smaller arc.

The free edge 38 of portion 34 extends inwardly at an acute angle with respect to a tangent 36 to the segment 28 at the point on the free edges 38 the turned-in portion begins. Also, as evident from an examination of FIG. 2, the acute angle continually increases as the end 30 extends from the annular portion 24 to the edge 38 of said turned-in portion. In some modifications portion 34 may turn inward in a small radius curve. Also, either or both the angled or turned-in portion 34 may hold approximately the same angle or curve for most or all of the axial length of the segmented flange.

It can be seen that with the provision of the turned-in portions on the segmented inner flange, the inside periphery of the cage 14 will not contact the edges of the segmented flange, preventing excessive wear and tear on the cage 14. Thus, no abrasive materials get into the mechanism in which the thrust bearing is placed and no rollers 18 are loosened in the cage 14.

I claim:

1. In combination with a thrust bearing having a thrust bearing cage with rolling members contained in pockets of said cage: an annular thrust plate having a plurality of channels circumferentially spaced on the inner periphery of the annular plate; and an axially extending segmented flange for guiding the thrust bearing cage extending from the inner periphery of the annular plate, each segment having each circumferential end forming at least a part of a side of a channel, each segment also having a turned-in portion extending from each of its circumferential ends.

2. The combination of claim 1 wherein each turned-in portion extends for a circumferential arc ranging from 3° to 20°.

3. The combination of claim 2 wherein the free edge of each turned-in portion extends inwardly at an acute angle with respect to a line tangent to the segment at the point on the free edge of the segment the turned-in portion begins.

4. The combination of claim 1 wherein the free edge of each turned-in portion extends inwardly at an acute angle with respect to a line tangent to the segment at the point on the free edge of the segment the turned-in portion begins.

* * * * *